United States Patent [19]

Schwob et al.

[11] Patent Number: 4,520,257
[45] Date of Patent: May 28, 1985

[54] ELECTRONIC NON-USE POWER INTERRUPTION SAFETY DEVICE FOR AN ELECTRIC FLAT-IRON

[75] Inventors: Pierre Schwob, Lyons; Christian Mieg, Meyzieu, both of France

[73] Assignee: SEB S.A., Selongey, France

[21] Appl. No.: 574,140

[22] Filed: Jan. 26, 1984

[30] Foreign Application Priority Data

Feb. 2, 1983 [FR] France ............... 83 01601

[51] Int. Cl.$^3$ .................. H05B 1/02; D06F 75/26; G08B 21/00
[52] U.S. Cl. .................. 219/250; 38/82; 200/61.52; 219/257; 219/492; 340/635; 340/686
[58] Field of Search ............... 219/250–253, 219/257, 259, 247, 242, 492, 493; 38/82; 200/61.52; 340/635, 686, 655

[56] References Cited

U.S. PATENT DOCUMENTS

| | | | |
|---|---|---|---|
| 2,382,587 | 8/1945 | Thomas | 219/250 X |
| 2,470,532 | 5/1949 | Thomas | 219/257 |
| 3,601,729 | 8/1971 | Hierta | 335/205 |
| 4,130,955 | 12/1978 | Baumgartner et al. | 219/257 |
| 4,203,101 | 5/1980 | Towsend | 219/250 |
| 4,243,875 | 1/1981 | Chang | 219/247 X |
| 4,366,366 | 12/1982 | Ekblad | 219/250 X |

FOREIGN PATENT DOCUMENTS

| | | |
|---|---|---|
| 2902817 | 8/1980 | Fed. Rep. of Germany . |
| 2355113 | 1/1978 | France . |
| 2408680 | 6/1979 | France . |
| WO82/03520 | 10/1982 | PCT Int'l Appl. . |
| 1406314 | 9/1975 | United Kingdom . |

Primary Examiner—A. Bartis
Attorney, Agent, or Firm—Young & Thompson

[57] ABSTRACT

An electronic safety device for automatically interrupting the supply of electric current to a heating resistor of an iron at the end of a predetermined interval of non-use, comprising a movable body adapted to control a position of contacts of an associated switch so that at least one opening-closing sequence of the switch contacts is obtained upon displacement of the movable body. Associated with the switch is a resistor bridge supplied with a rectified voltage E and comprising a first resistor $R_1$ and a second resistor $R_2$ in series with the switch contacts. A capacitor is connected to the terminals of resistor $R_2$, a voltage $V_o$ being collected at the terminals of said resistor $R_1$ and being applied to one input of a counter which is reset to zero each time voltage $V_o$ is higher than $E/2$, that is, upon closing of the contacts. The counter is connected to an input of a comparator for transmitting a voltage $V_1$ when the counter attains a predetermined counting threshold. The comparator is connected to a trigger of a triac having one terminal connected to a current supply and another terminal connected in series to the heating resistor. The comparator is adapted to deliver turn-on pulses to the trigger as long as no voltage $V_1$ is applied and to stop these turn-on pulses as soon as a voltage $V_1$ is applied, thereby interrupting the current supply to the heating resistor.

1 Claim, 8 Drawing Figures

ELECTRONIC NON-USE POWER INTERRUPTION SAFETY DEVICE FOR AN ELECTRIC FLAT-IRON

This invention relates to an electronic safety device for an electric flat-iron. This device permits automatic interruption of the supply of electric current to the iron at the end of a predetermined interval of non-use.

By way of example, a device of this type has been described in French Certificate of Utility Pat. No. 2 355 113: the object contemplated by this device was to prevent accidents by protecting the article to be ironed when the flat-iron is left unattended and is therefore motionless. In this case the time interval which elapses prior to interruption of the electric current supply is of short duration and means must be adopted in order to permit reheating of the iron from the cold state to its operating temperature since the user does not displace the iron during this period.

This device utilizes the motion of a ball placed within a curved tube having a convexity which is directed toward the top of the iron in order to ensure that the ball stops at the lowest point of the tube when the iron is not subjected to any movement. This position of immobilization of the ball is detected by a time-controlled scanning device which initiates an interruption of the supply after a predetermined interval of short duration. The disadvantage of this device lies in the fact that it is necessary to place the iron in an inclined position or on its rear edge when it is desired to heat the sole-plate from the cold state.

The aim of the present invention is to overcome the drawbacks of the design just described by providing a device for automatic interruption of the electric power supply to a flat-iron at the end of a predetermined time interval, thus making it possible to start heating of the iron from its normal position. A further effect of the device in accordance with the invention is the achievement of a substantial economy of electric power consumption.

The device contemplated by the invention for automatic interruption of the power supply to an electric flat-iron at the end of a predetermined interval of non-use comprises a movable body which is capable of displacement within a housing of the iron when the iron itself is being moved at the time of ironing. Said movable body is adapted to cooperate with a switch associated with a timer which is capable of initiating interruption of the power supply to the iron at the end of a predetermined time interval.

In accordance with the invention, said device is distinguished by the fact that the switch cooperates with the movable body so that at least one opening and closing movement of the switch contacts is obtained at the time of displacement of said movable body either in one direction or in the other. Means associated with said switch are provided for ensuring that the aforementioned opening-closing sequence of the contacts initiates resetting of the timer to zero and maintenance of the electric power supply to the heating resistor of the iron.

During each displacement in either one direction or in the other, the switch contacts carry out at least one opening-closing sequence for resetting of the timer which would otherwise initiate interruption of the power supply to the heating resistor at the end of a predetermined time interval.

When the iron is turned-on in the cold state, however, no special position of the iron is required since the predetermined time interval which elapses prior to cut-off is sufficient to bring the iron to the preselected temperature. In practice, this time interval is of the order of five minutes.

In a preferred embodiment of the invention, the means associated with the switch consist of a resistor bridge supplied with a rectified voltage E and comprising in series a resistor $R_1$, the contacts of a magnetic reed switch, a resistor $R_2$ having a substantially higher value than the resistor $R_1$, a capacitor C being connected to the terminals of said resistor $R_2$. A voltage signal Vo is collected at the terminals of the resistor $R_1$ and applied to one input of the timer which is responsive to a voltage signal of higher value than E/2. Said signal Vo is always lower than E/2 when the contacts are open or closed and assumes a value higher than E/2 only at the time of transition of said contacts from the open position to the closed position.

Under these conditions, only a displacement of the movable permanent magnet causes the emission of a signal which actuates the timer, the rest positions of the magnet being without effect on the switch, whether said positions correspond to either open or closed contacts of said switch.

Other features of the invention will be more apparent upon consideration of the following description and accompanying drawings, wherein.

Figure 8:
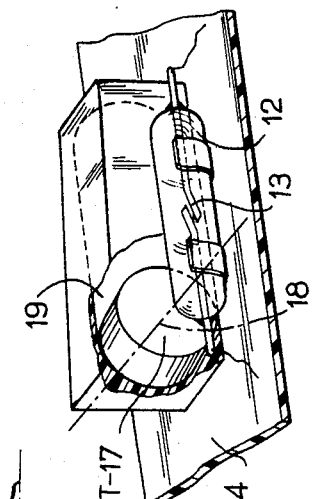
Figure 7:
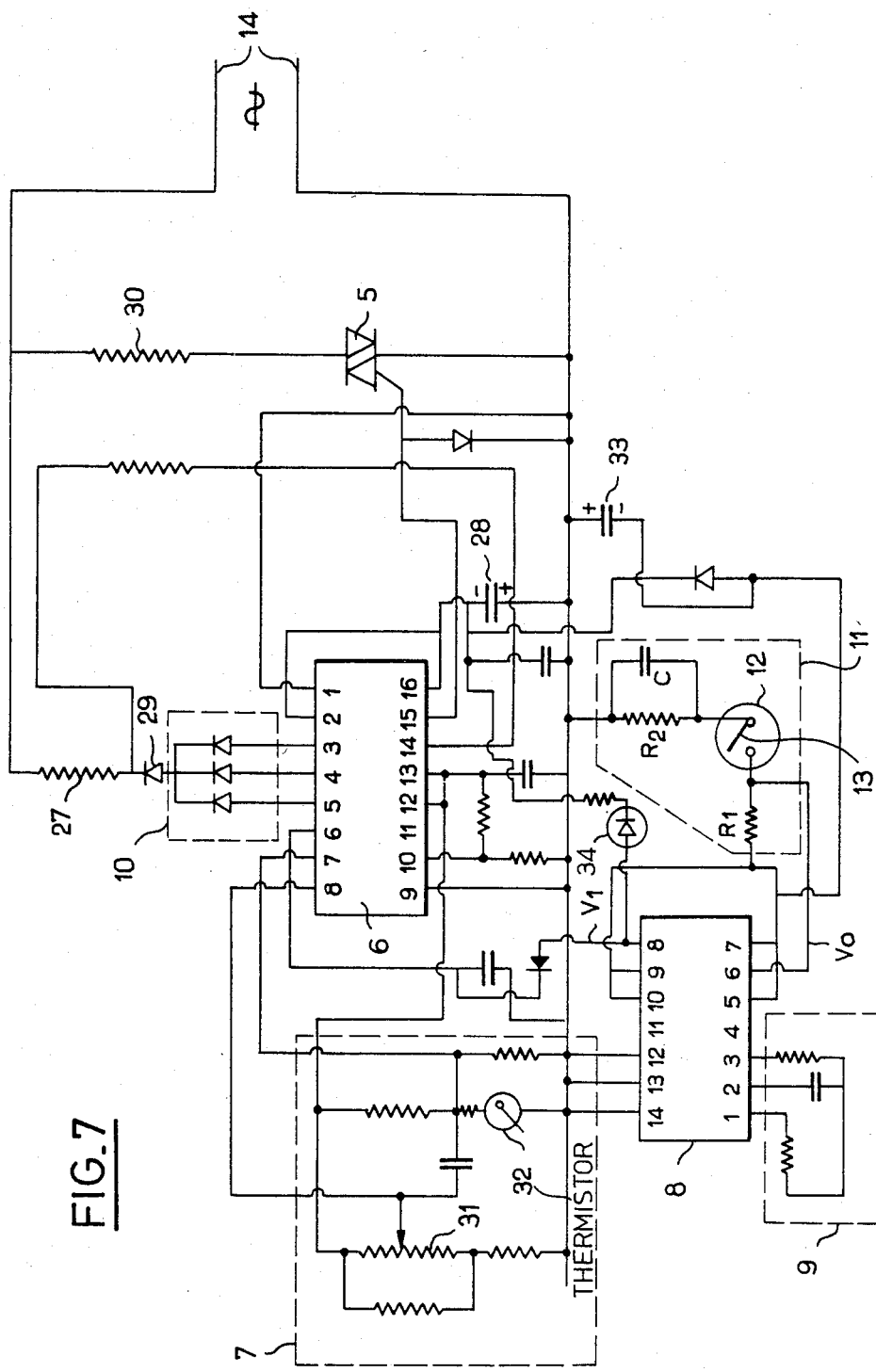

FIG. 7 provides a general schematic circuit diagram of the device in accordance with the invention;

FIG. 8 is a perspective diagram showing the contact-reed and magnet assembly.

Figure 2:
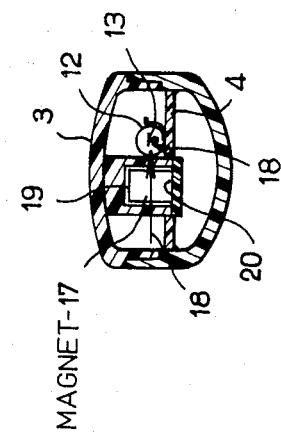
FIG. 2 is a sectional view taken along the plane II—II of FIG. 1.
Figure 1:
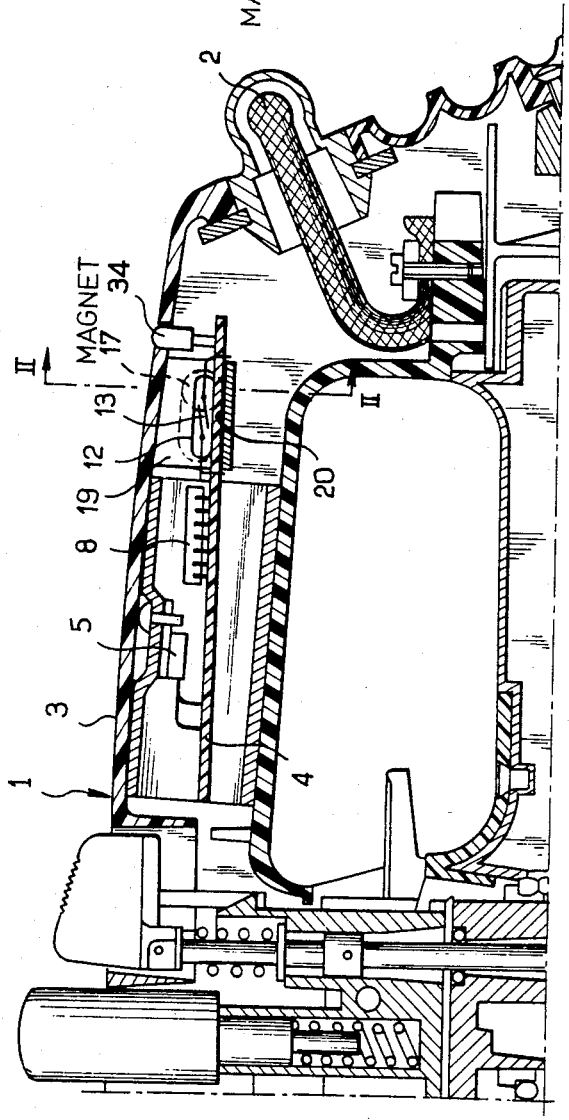
FIG. 1 is a partial longitudinal sectional view of a flat-iron in accordance with the invention.

In the embodiment of FIGS. 1 and 2, the flat-iron 1 is provided with a power supply cable 2 and a handle 3 formed, for example, of plastic material molded in two parts which fit one inside the other. The handle is of hollow construction and contains the device in accordance with the invention for automatic interruption of the electric power supply to the iron at the end of a predetermined time interval. This device comprises a plurality of electronic circuits represented schematically in FIG. 7 and mounted on a printed-circuit board 4. These electronic circuits mainly comprise a triac 5 controlled by a comparator 6, a bridge for measuring the temperature of the sole-plate of the iron 7, a pulse counter 8 controlled by an oscillator 9, a display device 10 for indicating the temperature zones and the state of the iron, for example by means of light-emitting diodes, and a circuit for controlling the zero-reset of the counter 11 comprising a switch 12. The complete circuitry is supplied from an alternating-current voltage source 14.

The switch 12 consists of a magnetic reed switch of a known type, the contacts 13 of which are open in the rest position and are sealed within a glass tube 16 which may be either evacuated or filled with an inert gas for protecting them both mechanically and chemically. These contacts 13 are of magnetic material and define a contact zone represented by the chain-dotted line 15. Said contacts are influenced by a magnet, the axis of magnetization 18 of which is perpendicular to the contact reeds or strips of the switch 12.

Figure 4:
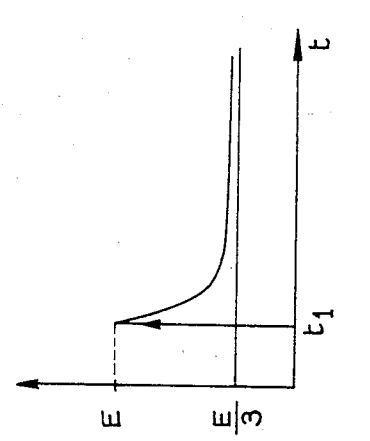
FIG. 4 is a diagram which is similar to FIG. 3 and shows the position of the reed-switch contacts in the open position (O) or in the closed position (F) as a function of the positions of the magnet within its housing.
Figure 3:
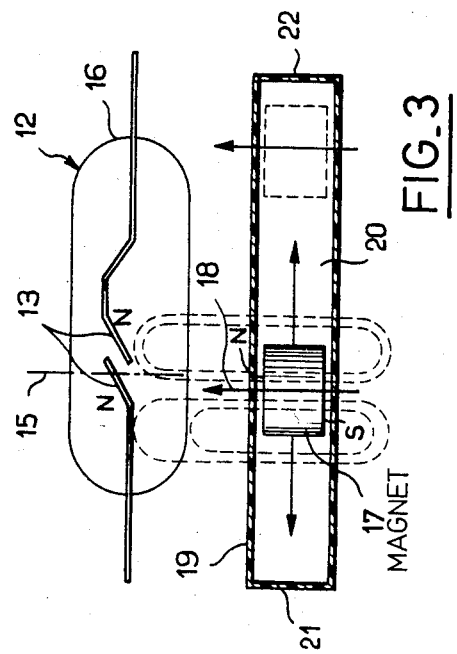
FIG. 3 is a schematic view of a reed switch so arranged as to cooperate with a movable magnet within a housing and illustrates the operation of the device.

The aforementioned magnet 17 is cylindrical and capable of inertial rolling motion on a substantially rectilinear and horizontal surface 20 within a housing 19 when the iron is moved. The cross-section of the housing 19 is slightly larger than the axial cross-section of the magnet 17 in order to permit free displacement of this latter between the end walls 21 and 22 of the housing (as shown in FIGS. 3 and 4) and the thickness of the magnet is preferably smaller than its diameter in order to facilitate its displacement. The housing 19 is substantially parallel to the longitudinal axis of the iron and is placed in a parallel position with respect to the sealed tube 12. The length of said housing is such that, at the time of displacement of the magnet 17, the axis of magnetization 18 scans a zone located on each side of the make zone 15 of the contacts 13. Said housing is attached in a suitable manner to the top wall of the handle 3 of the iron as well as to the printed-circuit board 4 (as shown in FIGS. 1 and 2).

FIG. 3 shows the north-pole face (N) and the southpole face (S) of the magnet 17 and also shows in dashed outline the lines of force of the magnetic field produced by said magnet. It is apparent from this figure that a north-seeking pole is formed on each contact 13 since the axis of magnetization 18 is very close to the contact zone 15 of the contacts and that a repulsive force is consequently exerted between these contacts, which accordingly results in opening of the circuit of the switch 12.

FIG. 4 is a schematic diagram showing the open position (O) or closed position (F) of the contacts 13 as a function of the different possible positions of the magnet 17 within its housing. When the magnet 17 is located on the extreme right-hand side of its housing 20, it is not sufficiently powerful to influence the contacts 13 and these latter are therefore naturally open. When the magnet 17 moves to the left from a given position of the magnetization axis 18 represented by the chain-dotted line 23, the magnetic field is closed by the two flexible contact-reeds and forms a south pole and a north pole respectively on the contacts 13. Attraction and closing of the contacts then takes place when the restoring force exerted by the reeds is overcome. When the magnet comes very close to the contact zone 15 of the contacts 13, namely starting from the chain-dotted line 24 as indicated earlier with reference to FIG. 3, the contacts 13 open and remain open until the axis of magnetization 18 passes beyond the threshold position represented by a chain-dotted line 25 in FIG. 4. Beyond this threshold, opposite poles are again formed on the contacts 13, thus resulting in attraction and closure. Similarly, when the magnet 17 continues to move towards the left within the housing 20, its influence decreases and the contacts 13 open after the axis of magnetization 18 has passed beyond the position represented by the chain-dotted line 26.

The same cycle of switching of contacts 13 takes place in a displacement in a direction opposite to that described in the foregoing. Thus, when the magnet 17 undergoes a displacement within the housing 20 either in one direction or in the other according to the direction of displacement of the iron, said magnet initiates at least one sequence of opening and closing of the reed contacts 13.

Figure 6:
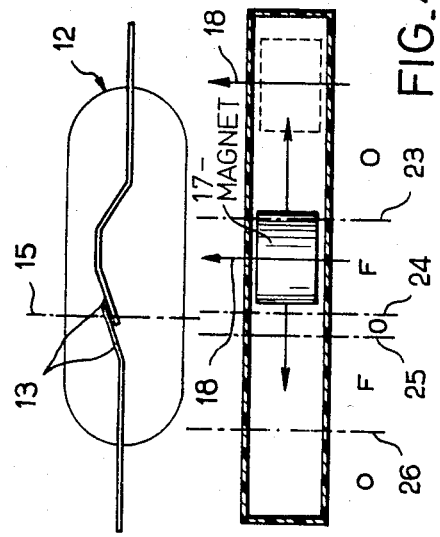
FIG. 6 represents the voltage signal Vo applied to the counter at the time of a sequence of opening-closing of the reed-switch contacts.
Figure 5:
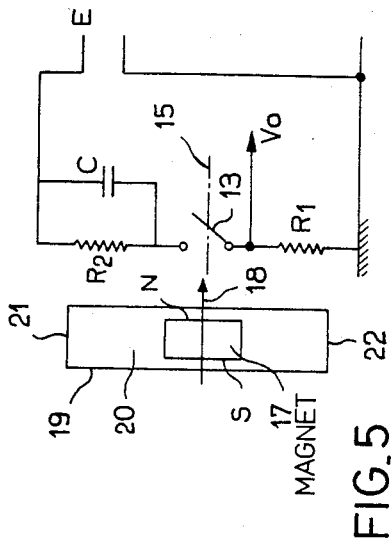
FIG. 5 is an electric circuit diagram of a resistor bridge controlled by the reed-switch contacts for zero-resetting of the timer.

Reference being made to FIGS. 5 and 6, it will now be shown that the above-mentioned sequence produces a zero-reset of the timer which is constituted by the pulse counter 8 and the zero-reset control circuit 11 of said counter as shown in FIGS. 5 and 7.

The zero-reset circuit 11 comprises a resistor bridge $R_1$, $R_2$ fed by a source of direct-current voltage E which is obtained after rectification from the alternating-current power supply 14 (as shown in FIG. 7). This voltage is delivered via a so-called voltage-dropping resistor 27, a rectifier diode 29 and an electrolytic smoothing capacitor 28.

Said resistor bridge comprises in series a resistor $R_1$, the contacts 13 of the reed switch 12 and a resistor $R_2$, a capacitor C being connected to the terminals of said resistor $R_2$. A voltage signal $V_o$ is collected at the terminals of the resistor $R_1$ and delivered to terminal No 6 of the pulse counter 8.

Resetting of the counter 8 takes place when a voltage signal having a value slightly higher than E/2 is delivered to the terminal No 6.

When the flat-iron is at rest, the contacts 13 can be either open or closed according to the position of the magnet 17 within its housing. If the contacts are closed, the voltage at the terminals of the resistor $R_1$ assumes a value $V_o = E \cdot R_1/(R_1 + R_2)$.

By way of example, if a value of resistance which is substantially double that of the resistor $R_1$ is chosen for the resistor $R_2$, it is apparent that the voltage Vo is equal to approximately E/3, with the result that the counter is not reset to zero.

If the contacts 13 are open, the voltage at the terminals of the resistor $R_1$ is zero, thus resulting in continued operation of the counter as well as its counting cycle.

On the other hand, at the time of transition at the instant $t_1$ (as shown in FIG. 6) from opening to closing of the contacts 13 produced by displacement of the magnet 17 in front of the reed switch 12, there takes place a sharp rise in voltage from O to +E at the terminals of the resistor $R_1$, this rise being followed in the example chosen by a progressive drop in said voltage to an asymptotic value E/3 as established beforehand when the capacitor C is completely charged.

Said voltage pulses E are applied to input No 6 of the counter 8 and reset said counter which is controlled by the oscillator 9.

If no voltage pulse E is applied to terminal No 6 at the end of a predetermined time interval of the order of five minutes, the counter 8 delivers a voltage signal $V_1$ via its output No 8 to terminal No 6 of the comparator 6.

Moreover, said comparator 6 is responsive to the unbalance of the temperature-measurement bridge 7 which is connected to inputs No 7 and No 8 of said comparator. This measuring bridge mainly comprises a potentiometer 31 for regulating the temperature of the sole-plate of the iron and a thermistor 32 for measuring this temperature. As long as the preselected temperature has not been reached, turn-on pulses are delivered to the trigger of the triac 5 via output No 15 of the comparator 6. When this temperature is reached, the measuring bridge 7 interrupts the delivery of these pulses and the heating resistor 30 is no longer supplied with current. Similarly, when a voltage signal $V_1$ is applied to terminal No 6 of the comparator 6, said signal interrupts the delivery of turn-on pulses to the triac 5 and consequently interrupts the supply of current to the heating resistor 30. At the same time, the comparator 6 initiates turn-on of a light-emitting diode 34 in order to provide a visual indication of this state of the iron.

A single subsequent displacement of the magnet 17 within its housing 21 will be sufficient to initiate a sequence of opening-closing of the contacts 13, thus resulting in resetting of the counter 8 and delivery of turn-on pulses to the triac 5 via the comparator 6 as well as extinction of the corresponding diode 34. The device further comprises an electrolytic capacitor 33 for maintaining the supply of current to the counter 8 in the event of a brief failure of the power system or line supply. This capacitor enables the counter 8 to memorize its state until the voltage of the line supply 14 is restored (over a time interval of about five seconds, for example).

The effects and advantages of this device are as follows:

When the iron is switched-on, the user is not obliged by the safety device to place the iron in a particular position in order to permit heating of the iron to the preselected temperature.

Moreover, the electric circuit adopted for the counter-reset control circuit is not affected by the position of the magnet. Said circuit is responsive only to the displacement of the magnet, with the result that the safety device in accordance with the invention operates irrespective of the position in which the iron may be left unattended.

In this case, the supply is cut-off at the end of a time interval of the order of five minutes, thus avoiding any unnecessary consumption of electricity. The safe assurance that the supply of current will be cut off at the end of a relatively short period of time brings appreciable peace of mind in the event, for example, that the user has been called away to other unforeseen occupations and has left the iron turned-on. The user has no reason to be anxious over any need to disconnect the iron since interruption of its current supply takes place automatically.

Finally, the reed switch adopted for the construction of the device in accordance with the invention is a device of reliable and rugged design which is capable of withstanding millions of operations, with the result that its service life is as long if not longer than the other electrical or electronic components of the iron.

As will be readily apparent, the present invention is not limited to the embodiments described in the foregoing and many other alternative forms of construction may accordingly be contemplated.

Thus it follows that the reed switch 12 and its control magnet 17 could be replaced by a ball or a cylinder which are capable of rolling within a suitable housing and the displacement of which would have the effect, for example, of depressing a flexible finger extending across the rolling surface provided for said ball or cylinder in order to initiate opening and then closing of an associated contact.

This assembly could be replaced by a contactless switch of the photodiode type associated with a light-emitting diode placed on each side of the housing provided for the movable body, the light beam of the light-emitting diode being interrupted by the passage of the opaque ball or cylinder which moves within its housing.

This assembly could also be replaced by a drop of mercury which slides along the bottom of a horizontal glass tube, two short metal electrodes being sealed in the bottom wall of the tube in order to be put into electrical contact with each other by the mercury as it passes during displacement of the flat-iron.

Similarly, the counter of the timing device could be replaced by an RC circuit in which a charged capacitor C is discharged through a resistor R, the resistor and the capacitor being calculated so as to obtain the predetermined time interval for operation of the comparator or of a suitably adapted relay and for cutting-out the resistor of the flat-iron.

The surface for rectilinear displacement of the magnet 17 or of the movable body could have a low slope in order to give said movable body a preferential position of rest without thereby entailing any disadvantages in regard to the operation of the device. The only condition to be observed is that the above-mentioned slope should be sufficiently low to ensure that, during a normal displacement of the iron, the movable body should be set in motion and produce at least one sequence of opening-closing of the controlled switch.

What is claimed is:

1. An electronic safety device for automatically interrupting the supply of electric current to a heating resistor of an iron at the end of the predetermined interval of non-use, said device comprising a movable body which is capable of displacement within a housing of the iron when the iron is being moved, said movable body being adapted to control a position of contacts of an associated switch so that at least one opening-closing sequence of said switch contacts is obtained upon displacements of said movable body, means associated with said switch consisting of a resistor bridge supplied with a rectified voltage E and comprising a resistor R1 and a resistor R2 in series with said switch contacts, a capacitor connected to the terminals of said resistor R2, there being a voltage Vo at the terminals of said resistor R1, the respective values of said resistors R1 and R2 being such that said voltage Vo is lower than E/2 when said switch contacts are open or closed and higher than E/2 at the time of transition of said contacts from open to closed position, means to apply said voltage Vo to one input of a counter which is reset to zero each time said voltage Vo is higher than E/2, said counter being connected to an input of a comparator for transmitting a voltage V1 when said counter attains a predetermined counting threshold, said comparator being connected to a trigger of a triac having one terminal connected to a current supply and another terminal connected in series to said heating resistor, said comparator being adapted to deliver turn-on pulses to said trigger as long as no voltage V1 is applied and to stop said turn-on pulses as soon as a voltage V1 is applied to said one input of said comparator, thereby interrupting the current supply to the heating resistor.

* * * * *